April 1, 1969 RYOICHI ABE 3,436,536

FUNCTION GENERATOR

Filed Dec. 9, 1965 Sheet 1 of 2

INVENTOR
RYOICHI ABE

BY Paul M. Craig, Jr.
ATTORNEY

INVENTOR
RYOICHI ABE

BY Paul M. Craig, Jr.
ATTORNEY 3,436,536
Patented Apr. 1, 1969

3,436,536

FUNCTION GENERATOR

Ryoichi Abe, Kodaira-shi, Japan, assignor to Hitachi Electronics Company, Ltd., Tokyo, Japan, a corporation of Japan Filed Dec. 9, 1965, Ser. No. 512,674
Claims priority, application Japan, Dec. 19, 1964, 39/71,620
Int. Cl. G06g 7/26
U.S. Cl. 235—197 6 Claims

ABSTRACT OF THE DISCLOSURE

An arbitrary function generator is described for analog computers in which a grounded base transistor circuit having a segmented straight-line input/output characteristic is provided to approximately generate an output voltage as a function of an input voltage.

The present invention relates to segmented straight-line function generators which are utilized principally in analog computers and supply, as their output voltages, approximate functions $F(E_i)$ of input voltages $E_i$ represented by the segmented straight-lines.

The description of the present invention will be given with reference to the attached drawings in which:

FIG. 4 is a diagram showing a conventional segmented straight-line function generating method utilizing trapezoidal characteristics;

FIG. 5 is a circuit diagram of an embodiment of the function generator according to the present invention;

FIG. 6 is a diagram showing the relation between each constant and variable of FIG. 5 and the coordinates of the trapezoidal characteristics;

FIG. 7 is a diagram of the equivalent circuit of the input resistance of the circuit according to the invention; and FIG. 8 is a circuit diagram showing an example in which the voltage developed at the emitter of the transistor in the circuit of the invention is compensated for.

Figures 1, 2:
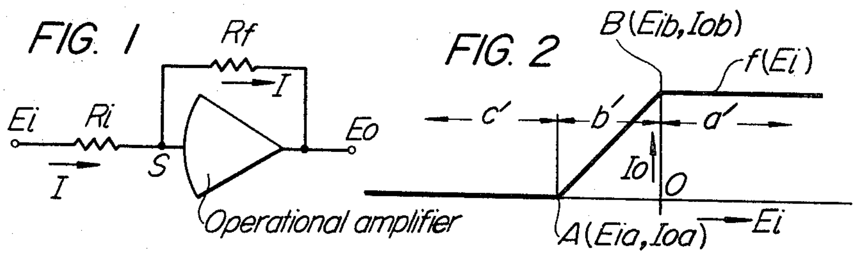
FIG. 1 is a diagram of a generally used arithmetic circuit utilizing an operational amplifier.
FIG. 2 is a diagram showing trapezoidal input-output characteristics.

As one system for generating a function $F(E_i)$, there is a method in which an input resistor $R_i$ in varied by an input voltage in an operational amplifier (a D.C. amplifier the output voltage of which is null when the input voltage thereof is null, the amplification factor of which is very large, and the polarities of the input and the output voltages of which are opposite to each other) having the input resistor $R_i$ and a feed-back resistor $R_f$ as shown in FIG. 1. Since the addition point of the operational amplifier can usually be equivalently regarded as zero potential, in a function generator of this system if the input voltage $E_i$ of the input resistor $R_i$ and output current of the amplifier are in a relation $$I=-KF(E_i) \quad (1)$$

(where K is a positive constant) when the output side of the resistor $R_i$ is connected with the zero potential point S, it will be sufficient to establish $$F_fK=1 \quad (2)$$

utilizing the relation $$E_o=-R_fI \quad (3)$$

fulfilled by the circuit of FIG. 1 for generation of the relation $$E_o=F(E_i) \quad (4)$$

Thus, the generation of the functional relation between the two voltages expressed by Formula 4 can be replaced by the generation of the relation between the voltage and the current through the use of the amplifier.

As a method of generating a segmented straight-line approximate function with a voltage input and a current output, there is a method in which a desired segmented straight-line is obtained by adding (the addition includes the addition of opposite sign, i.e. a subtraction) input-output characteristics (hereinafter referred to as trapezoidal characteristics) as shown in FIG. 2. This method has an advantage in that the setting of a function is easy.

In FIG. 2, $E_i$ and $I_o$ are respectively an input voltage axis and an output current axis, and $f(E_i)$ is a trapezoidal characteristic. The coordinates of two tip points A and B are assumed to be $(E_{ia}, I_{oa})$, $(E_{ib}, I_{ob})$ respectively. This trapezoidal characteristic is expressed as follows:

(a) When $$E_i>E_{ib},\ I_o=I_{ob} \quad (5)$$

(b) When $$E_{ib}\geqq E_i\geqq E_{ia},$$

$$I_o=\frac{I_{ob}-I_{oa}}{E_{ib}-E_{ia}}(E_i-E_{ia}) \quad (6)$$

(c) When $$E_{ia}>E_i,\ I_o=I_{oa}=0 \quad (7)$$

Thus, the output current $I_o$ is zero when the input voltage $E_i$ is less than a certain definite value $E_{ia}$, and becomes $I_{ob}$ when $E_i$ reaches another definite value $E_{ib}$, and thereafter $I_o$ remains at the definite value $I_{ob}$ even if $E_i$ becomes larger than $E_{ib}$. Although FIG. 2 is for the first and second quadrants, a similar situation holds for other quadrants.

Figure 3:
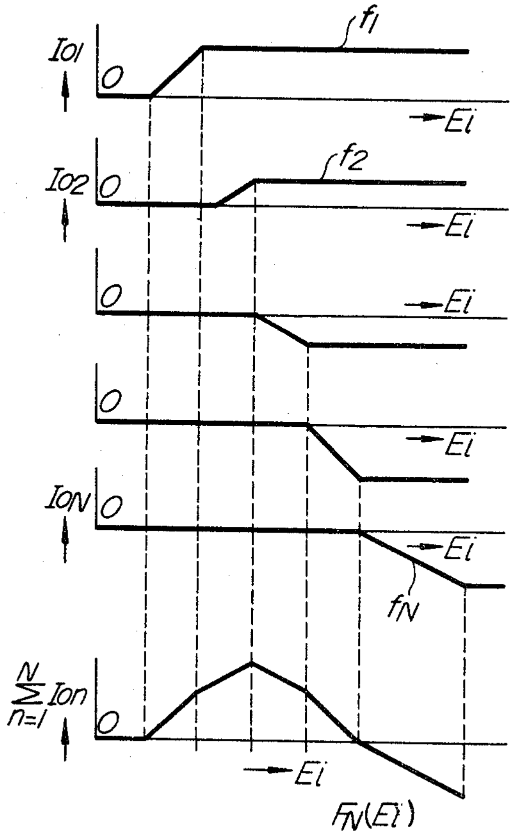
FIG. 3 is a diagram explaining the generation of a segmented straight-line approximate function by adding two or more trapezoidal characteristics.

FIG. 3 is a diagram explaining the process wherein a function $F_N(E_i)$, approximately expressed by a segmented straight-line is generated by adding N trapezoidal characteristics $f_1, f_2, \ldots, f_r$. The addition of these trapezoidal characteristic output currents is usually carried out by an operational amplifier, which finally provides a voltage output.

The present invention relates to a novel trapezoidal characteristics generating circuit with voltage input and current output among trapezoidal characteristics generating circuits utilized in the above-mentioned kind of segmented straight-line approximate function generators. Concerning trapezoidal characteristics generating circuits, various types have been utilized up to the present, among which a system wherein a pair of single bend lines (a polygonal line consisting of two line segments and having one bend point) of equal slope are neutralized is widely known. However, for embodying this method, a complicated circuit is necessary, and it is difficult to obtain ideal trapezoidal characteristics, and, in addition, the cost of manufacturing is considerable.

An object of the present invention is to provide a very simple circuit which generates ideal trapezoidal characteristics with high accuracy.

Figures 4, 5, 6, 7, 8:
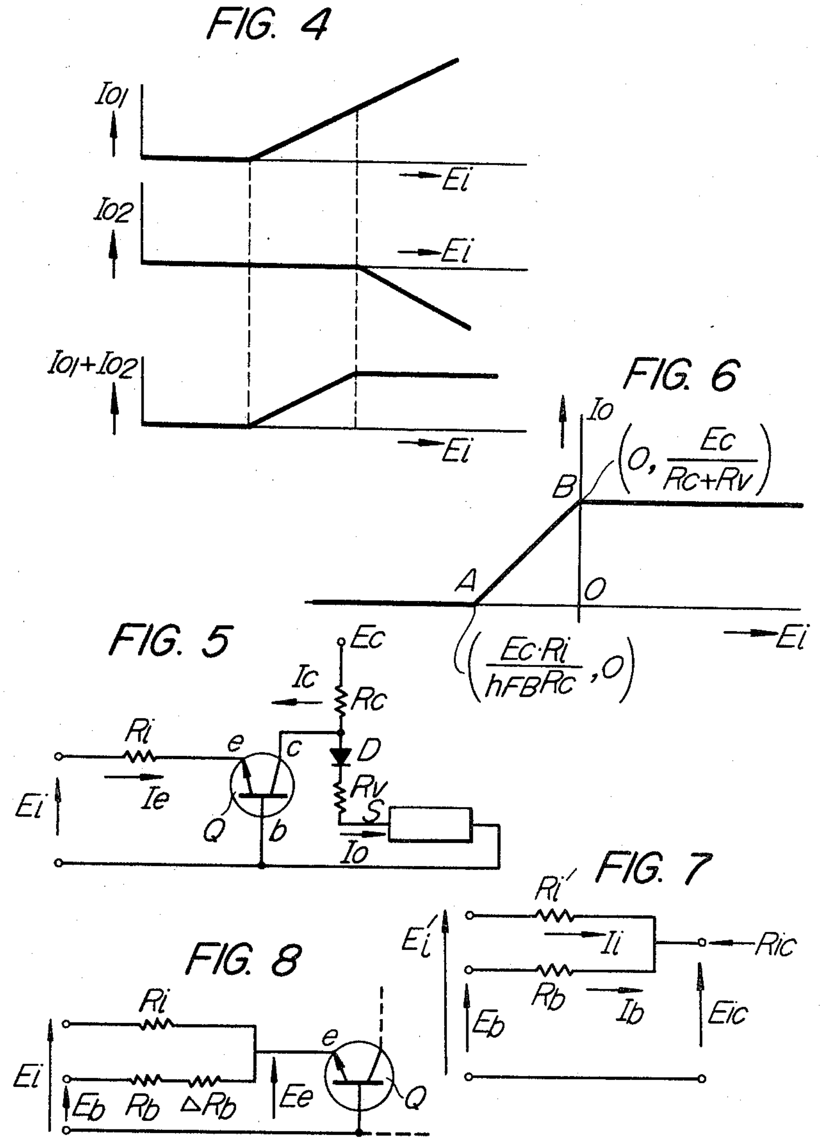

FIG. 5 shows an embodiment of the present invention. An input voltage $E_i$ is applied to the emitter *e* of a transistor Q through an input resistor $R_i$. Although an NPN transistor is exemplified in FIG. 5, of course a PNP transistor may likewise be used, in which case, however, the polarities of the input voltage and output current thereof are reversed.

The base *b* of the transistor Q is connected with a common potential point (a zero potential point in this example), and the collector *c* thereof is connected with one end of a resistor $R_c$ and the anode of a diode D. The cathode of the diode D is connected with one end of a resistor $R_v$, and the other end of the resistor $R_v$ is connected with a low impedance point S. It is assumed that the potential at this low impedance point S is regarded as substantially equal to the potential at the common potential point (the point S of the operational amplifier shown in FIG. 1 is a representative example of this low impedance point). A current flowing into this low impedance point S is taken as an output current $I_o$. When $E_i \geqq 0$, a current flowing through the emitter *e* of the NPN transistor is very low, and is negligible compared with a forward collector current $I_c$ which will be described later. If the emitter current is zero, also the collector current $I_c$ is naturally zero. Therefore, when $E_i > 0$, the current flowing into the point S is $$I_o = \frac{E_c}{R_c + R_v} \qquad (8)$$

When $E_i \leqq 0$, a current $$I_e = \frac{E_i}{R_i} \qquad (9)$$

flows into the emitter *e* of the transistor Q. In actuality, an input resistor $r_i$ to the transistor Q is inserted in series with the resistor $R_i$. However, generally the value thereof is small, and can be neglected compared with the resistor $R_i$. In a grounded base circuit as shown in FIG. 5, the collector current $I_c$ is expressed as $$I_c = h_{FB} I_e \qquad (10)$$

if the direction of the current is taken as shown therein. The D.C. current amplification factor $h_{FB}$ of the transistor Q in the grounded base circuit has a negative sign, and is usually very nearly 1 although the absolute value thereof is smaller than 1. The amplification factors of some transistors are more than 0.99.

If the current expressed by the Formula 10 flows through the collector of the transistor Q, the output current becomes $$I_o = \frac{E_c}{R_c + R_v} - \frac{R_c I_e}{R_c + R_v} = \frac{1}{R_c + R_v}\left(E_c - \frac{h_{FB} R_c E_i}{R_i}\right) \qquad (11)$$

from the Formulas 8 and 10 and the figure. The operation of the NPN transistor is actuated when the collector voltage is higher than the collector voltage $E_{cm}$ (this has usually a negative value smaller than $E_c$) at the time when the collector is saturated, and there is a possibility that the contents of the brackets of the Formula 11 become negative. Consequently, if both ends of the diode D are short-circuited, the output current $I_o$ can also take negative values. However, in the circuit of FIG. 5, the output current $I_o$ never becomes negative due to the action of the diode D. That is, only when $$E_c - \frac{h_{FB} R_c E_i}{R_i} > 0$$

$I_o$ is positive, and when $$E_c - \frac{h_{FB} R_c E_i}{R_i} \leqq 0$$

is zero.

Integrating the above, (*a'*) When $$E_i \geqq 0,\ I_o = \frac{E_c}{R_c + R_v} \qquad (8)$$

(*b'*) When $$0 \geqq E_i \geqq \frac{E_c R_i}{h_{FB} R_c},\ I_o = \frac{1}{R_c + R_v}\left(E_c - \frac{h_{FB} R_c E_i}{R_i}\right) \qquad (11)$$

(*c'*) When $$\frac{E_c R_i}{h_{FB} R_c} > E_i,\ I_o = 0 \qquad (12)$$

Each of these ranges (*a'*), (*b'*) and (*c'*) corresponds to that shown in FIG. 2.

By comparing (*a'*), (*b'*) and (*c'*) with aforementioned (*a*), (*b*) and (*c*), respectively, $$E_{ia} = \frac{E_c R_i}{h_{FB} R_c} \qquad (13)$$

$$I_{oa} = 0 \qquad (14)$$

$$E_{ib} = 0 \qquad (15)$$

$$I_{ob} = \frac{E_c}{R_c + R_v} \qquad (16)$$

are obtained.

The trapezoidal characteristic of FIG. 2 is shown with the above four formulas in FIG. 6. From these four formulas it can be seen that arbitrarily determinable, by selecting the values of the circuit constants, two coordinates $$E_{ia} = E_c R_i / h_{FB} R_c \qquad (13)$$

and $$I_{ob} = E_c / R_c + R_v \qquad (16)$$

$$I_{ob} = \frac{E_c}{R_c + R_v} \qquad (16)$$

in the coordinates of two bend points can be varied independently from each other. For example, $E_{ia}$ can be varied independently of $I_{ob}$ by varying the resistor $R_i$, and $I_{ob}$ can be varied independently of $E_{ia}$ by varying $R_v$.

In the above description, $E_i$ and $R_i$ are treated respectively as one voltage and one resistor. However, if they are regarded as shown in FIG. 7 as a composite voltage $E_{ic}$ of two voltages $E_i'$ and $E_b$ and a composite resistor $R_{ic}$ of two resistors $R_i'$ and $R_b$, they become respectively, $$E_{ic} = \frac{R_b E_i' + R_i' E_b}{R_i' + R_b} \qquad (17)$$

and $$R_{ic} = \frac{R_i' R_b}{R_i' + R_b} \qquad (18)$$

Since $E_i = 0$ is the $E_i$ coordinate of the bend point B, $$E_i' = -\frac{R_i'}{R_b} E_b \qquad (19)$$

becomes the $E_i'$ coordinate of the bend point B, and hence the position of the bend point B can be moved to any point along the $E_i$-axis by selecting an appropriate value of $R_i'$, $R_b$ or $E_b$.

Putting the Formulas 17 and 18 into the Formula 13 and taking $E_{ia}'$ as a new coordinate $E_i$ of the point A, one gets $$\frac{R_b E_{ia}' + R_i' E_b}{R_i' + R_b} = \frac{E_c}{h_{FB} R_c} \cdot \frac{R_i' R_b}{R_i' + R_b} \qquad (20)$$

from which $$E_{ia}' = \frac{E_c R_i'}{h_{FB} R_c} - \frac{R_i'}{R_b} E_b \qquad (21)$$

Now, if it is assumed that $R_i'$ is selected to be $R_i' = R_i$, the $E_i$ coordinate of the point A displaces, concurrently with that of the point B, the same distance and in the same direction. That is, if $R_i'$ is made equal to $R_i$ in the circuit of FIG. 7, the trapezoidal characteristic $E_i$ of FIG. 2 or FIG. 6 displaces by $$-\frac{R_i}{R_b} E_b \qquad (22)$$

in the axis direction. Consequently, the trapezoidal characteristics $f_1, f_2, f_3, \ldots, f_N$ having different bend points from each other as shown in FIG. 3 can easily be generated.

Although an input impedance $h_{IB}$ to the emitter of the transistor Q is treated as being zero in the above description, of course it is in fact not zero and takes a value variable within a certain definite range within the operation range of the transistor. When the input signal voltage $E_i$ or $E_i'$ and the definite voltages $E_c$ and the bias voltage $E_b$ are sufficiently larger than the voltage $E_e$ being generated at the emitter due to the input impedance $h_{IB}$ of the emitter, $h_{IB}$ may be regarded as zero without giving rise to any obstacle. However, when a part or all of these voltages are not sufficiently larger than the emitter voltage $E_e$, "$E_e$ is not proportional to the current, but is approximately a logarithm of the current for the greater part within the useful range of the forward current region." (This is due to the emitter input characteristics of the grounded base transistor.) By utilizing this fact, regarding the emitter voltage $E_e$ as a definite voltage, and shifting the bias voltage $E_b$ or the resistor $R_b$ shown in FIG. 7 by a definite value, the error arising from the existence of the input impedance $h_{IB}$ to the emitter can be approximately compensated for.

More specifically, in order to compensate for the emitter voltage $E_e$ by shifting a resistor $R_b$ by $\Delta R_b$ in the circuit of FIG. 8, it is sufficient to realize $$\frac{E_{ia}(R_b + \Delta R_b) + E_b R_i}{R_b + \Delta R_b + R_i} - E_e = \frac{E_{ia} R_b + E_b R_i}{R_b + R_i} \qquad (20)$$

at the bend point B in FIG. 2, from which $$\Delta R_b \doteqdot \frac{E_e}{(E_{ia} - E_b)} \cdot \frac{(R_b + R_i)^2}{R_i} \qquad (21)$$

is obtained. It is also possible to compensate for $E_e$ by connecting a circuit other than $R_b$ or $E_b$ to the emitter to perform addition of resistances.

What is claimed is:

1. A function generator comprising a grounded base transistor having emitter, base and collector electrodes, a first resistor connected to the emitter of the transistor, means for applying an input voltage through the first resistor across the emitter-base of the transistor, a second resistor having a first terminal directly connected to the collector of the transistor, voltage source means connected to the remaining second terminal of the second resistor for supplying operation voltage through the second resistor across the collector-base of the transistor, a diode having one terminal thereof connected to the juncture of the first terminal of the second resistor and the collector of the transistor and poled in a manner such that a forward current is supplied to the diode from the voltage source means, a third resistor having a first terminal connected to the remaining terminal of the diode and having the remaining terminal thereof in conjunction with the base of the transistor define a pair of output terminals for the function generator across which a segmented straight-line output current having a break-in bend point and a break-out bend point can be obtained measured with respect to the input voltage.

2. A function generator according to claim 1 wherein the first resistor comprises a variable resistor whereby the break-in bend point of a segmented straight-line current may be varied independent of the break-out bend point thereof.

3. A function generator according to claim 1 wherein the third resistor comprises a variable resistor whereby the break-out bend point of a segmented straight-line output current may be varied independent of the break-in bend point thereof.

4. A function generator according to claim 1 further comprising a fourth resistor connected at one end thereof to the emitter of said transistor and bias voltage means connected between the other end of said fourth resistor and the base of said transistor for supplying therebetween a bias voltage to shift the break-in and break-out bend points of a segmented straight-line output current along the input voltage axis of the trapezoidal characteristic exhibited by the function generator.

5. A function generator according to claim 1 wherein the first resistor comprises a variable resistor whereby the break-in bend point of a segmented straight-line output current may be varied independent of the break-out bend point thereof, and wherein the third resistor comprises a variable resistor whereby the break-out bend point of a segmented straight-line output current may be varied independent of the break-in bend point thereof.

6. A function generator according to claim 5 further comprising a fourth resistor connected at one end thereof to the emitter of said transistor and voltage bias means connected between the other end of said fourth resistor and the base of said transistor for supplying therebetween a bias voltage to shift the break-in and break-out bend points of a segmented straight-line output current along the input voltage axis of the trapezoidal characteristic exhibited by the function generator.

References Cited

UNITED STATES PATENTS

| | | | |
|---|---|---|---|
| 3,103,583 | 9/1963 | Nathan et al. | 235—197 |
| 3,120,605 | 2/1964 | Nathan et al. | 235—197 |
| 3,244,867 | 4/1966 | Lavin | 235—197 |

MALCOLM A. MORRISON, *Primary Examiner.*

ROBERT W. WEIG, *Assistant Examiner.*

U.S. Cl. X.R.

307—288; 328—158